(12) United States Patent  
Rimmington (10) Patent No.: US 9,440,797 B1
(45) Date of Patent: Sep. 13, 2016

(54) CONVEYOR CHAIN MAP FOR A MINING SYSTEM

(71) Applicant: Joy MM Delaware, Inc., Wilmington, DE (US)

(72) Inventor: Gareth Rimmington, Barnsley (GB)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 14/789,964

(22) Filed: Jul. 1, 2015

(51) Int. Cl.
*B65G 19/08* (2006.01)
*B65G 43/00* (2006.01)
*B65G 17/38* (2006.01)
*G01P 3/44* (2006.01)
*G05B 15/02* (2006.01)

(52) U.S. Cl.
CPC .............. *B65G 43/00* (2013.01); *B65G 17/38* (2013.01); *B65G 19/08* (2013.01); *G01P 3/44* (2013.01); *G05B 15/02* (2013.01); *B65G 2201/045* (2013.01); *B65G 2203/0283* (2013.01); *B65G 2812/02881* (2013.01)

(58) Field of Classification Search
CPC ........... B65G 19/08; B65G 2201/045; B65G 2812/02881; B65G 43/00; B65G 17/38; G01P 3/44; G05B 15/02
USPC .................................... 198/502.3, 725–735.6
See application file for complete search history.

(56) References Cited

U.S. PATENT DOCUMENTS

| | | | |
|---|---|---|---|
| 2,614,686 A * | 10/1952 | Long ...................... | B65G 43/00 198/606 |
| 3,963,115 A | 6/1976 | Teske et al. | |
| 5,272,924 A | 12/1993 | Tassic et al. | |
| 5,490,590 A | 2/1996 | Courtney | |
| 5,563,392 A | 10/1996 | Brown et al. | |
| 7,140,486 B2 * | 11/2006 | Kim .......................... | F16H 7/08 198/502.4 |
| 7,779,994 B1 * | 8/2010 | Travis ..................... | B65G 43/02 198/810.01 |
| 8,191,703 B2 | 6/2012 | Tokhtuev et al. | |
| 8,256,607 B2 | 9/2012 | Wallace et al. | |
| 8,285,494 B2 | 10/2012 | Vozner | |
| 8,561,785 B2 * | 10/2013 | Bugar ..................... | B65G 19/18 198/323 |
| 8,636,140 B2 | 1/2014 | Tout et al. | |
| 8,657,105 B2 | 2/2014 | Twigger et al. | |
| 2004/0262132 A1 | 12/2004 | Pauley et al. | |
| 2010/0270128 A1 | 10/2010 | Hill | |
| 2013/0068594 A1 | 3/2013 | Worthington et al. | |
| 2014/0131176 A1 | 5/2014 | Minkin | |
| 2014/0236348 A1 | 8/2014 | Salice et al. | |
| 2015/0144459 A1 * | 5/2015 | Wallace ................. | B65G 43/02 198/502.1 |

* cited by examiner

*Primary Examiner* — Mark A Deuble
(74) *Attorney, Agent, or Firm* — Michael Best & Friedrich LLP (57) ABSTRACT

A mining system that includes a conveyor and controller. The conveyor includes a first sprocket and a second sprocket, a chain, a drive mechanism, and a sensor. The chain is associated with the first sprocket and the second sprocket and includes a plurality of chain components. The drive mechanism is coupled to the first sprocket or the second sprocket and is operable to drive the first sprocket or the second sprocket. The sensor is operable to generate a signal related to a characteristic of the conveyor. The controller is operable to receive the signal from the sensor, determine a number of chain components that have passed a datum point based on the signal, determine the location of at least one of the plurality of chain components based on the number of chain components that have passed the datum point, and update a map of the chain based on the location.

20 Claims, 10 Drawing Sheets

CONVEYOR CHAIN MAP FOR A MINING SYSTEM

BACKGROUND

This invention relates to a conveyor, such as an armored face conveyor ("AFC") or a beam stage loader ("BSL").

SUMMARY

Longwall mining systems include, among other things, a conveyor such as an AFC or BSL to transport a mined material (e.g., coal) from an area where the material is being mined to an area for processing (e.g., crushing, storage, etc.). AFCs, for example, include a first sprocket and a second sprocket around which a chain is provided. The chain is driven by one or more actuators (e.g., a maingate motor, a tailgate motor, etc.), and the movement of the chain around the sprockets causes a conveyor to transport the mined material.

Traditional belt-type conveyors are susceptible to slip between drums/rollers and a conveyor belt (e.g., excessive load can cause slip between metal or rubberized drive drums/rollers and the conveyor belt). The slip between rollers and a conveyor belt prevents the position of specific portions of the conveyor belt from being known with certainty during operation because the positions may be constantly changing by unknown amounts. In addition to traditional slip, another type of relative disengagement can occur in belt-type conveyors known as creep. Creep is caused by changes in the specific length of the conveyor belt as a load is transferred to it by a driving drum surface. Creep is often steady for a given load, but still causes a change in the relative position of drums/rollers and a conveyor belt over time. As a result of the slip, creed, and other disadvantages of belt-type conveyors, such conveyors are unsuitable for use at a mining face of a longwall mining operation and other high-load mining applications.

An AFC or BSL, on the other hand, has a positive, fixed relationship between the sprockets of the conveyor and the conveyor chain. The positive, fixed relationship between the sprockets and the conveyor chain in an AFC or BSL allows for the position of any of a variety of components or connectors (e.g., chain links, flight bars, etc.) to be known or determined during the operation of the conveyor. Thus, the invention described herein relates to a conveyor (e.g., an AFC, a BSL, etc.) that is used in a mining operation and that includes a map of a chain assembly or chain in the conveyor. The map of the chain assembly or chain in the conveyor allows for substantially real-time positional awareness of any point of the chain assembly or chain, as well as a variety of maintenance related features associated with knowing the substantially real-time position of the chain assembly or chain.

In one embodiment, the invention provides a mining system that includes a conveyor and a controller. The conveyor includes a first sprocket and a second sprocket, a chain, a drive mechanism, and a sensor. The chain is associated with the first sprocket and the second sprocket and includes a plurality of chain components. The drive mechanism is coupled to the first sprocket or the second sprocket and is operable to drive the first sprocket or the second sprocket. The sensor is operable to generate a signal related to a characteristic of the conveyor. The controller is operable to receive the signal from the sensor, determine a number of chain components that have passed a datum point based on the signal, determine the location of at least one of the plurality of chain components based on the number of chain components that have passed the datum point, and update a map of the chain based on the location of the at least one of the plurality of chain components.

In another embodiment, the invention provides a method of determining a location of a chain component of a chain in a conveyor of a mining system. The method includes receiving, at a processor, a signal from a sensor related to a characteristic of the conveyor, determining, using the processor, a number of chain components that have passed a datum point based on the signal, determining, using the processor, the location of the chain component based on the number of chain components that have passed the datum point, and updating, using the processor, a map of a chain based on the location of the chain component.

In another embodiment, the invention provides a controller including a processor and a memory. The controller includes executable instructions stored in the memory to receive, at the processor, a signal from a sensor related to a characteristic of a conveyor, determine, using the processor, a number of chain components that have passed a datum point of the conveyor based on the signal, determine, using the processor, a location of a chain component based on the number of chain components that have passed the datum point of the conveyor, and update, using the processor, a map of a chain stored in the memory based on the location of the chain component.

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Independent aspects of the invention will become apparent by consideration of the detailed description and accompanying drawings.

DETAILED DESCRIPTION

The invention described herein relates to an industrial machine, such as an armored face conveyor ("AFC"), beam stage loader ("BSL"), or another similar conveyor that can be used at a mining location to transport mined material away from a mining face. The conveyor includes, among other things, a chain, a sprocket, a drive mechanism, and a controller. A datum or reference point is established for the conveyor from which a location for each component or link of the chain can be determined or calculated. An output signal from a sensor (e.g., a rotor shaft tachometer) is used to determine a number of components or links of the chain that have passed the datum point. After the number of components or links of the chain that have passed the datum point has been determined, the location of each component or link is determined or calculated. The controller generates and displays a map of the chain or conveyor based on the location of each component or link of the chain. The map of the chain can be manually or automatically updated with additional information related to the operation, performance, maintenance, status, and history of the chain. The map of the chain can also be used to perform maintenance on the chain by positioning a chain component or link of interest at the datum point for repair, replacement, etc. The map of the chain provides a graphical representation of the chain, a plurality of chains, a mine, etc., to allow an operator to readily locate, monitor, and update specific portions of the map as needed. For descriptive purposes, the invention is described herein with respect to embodiments of the invention that include an AFC.

Figure 1:
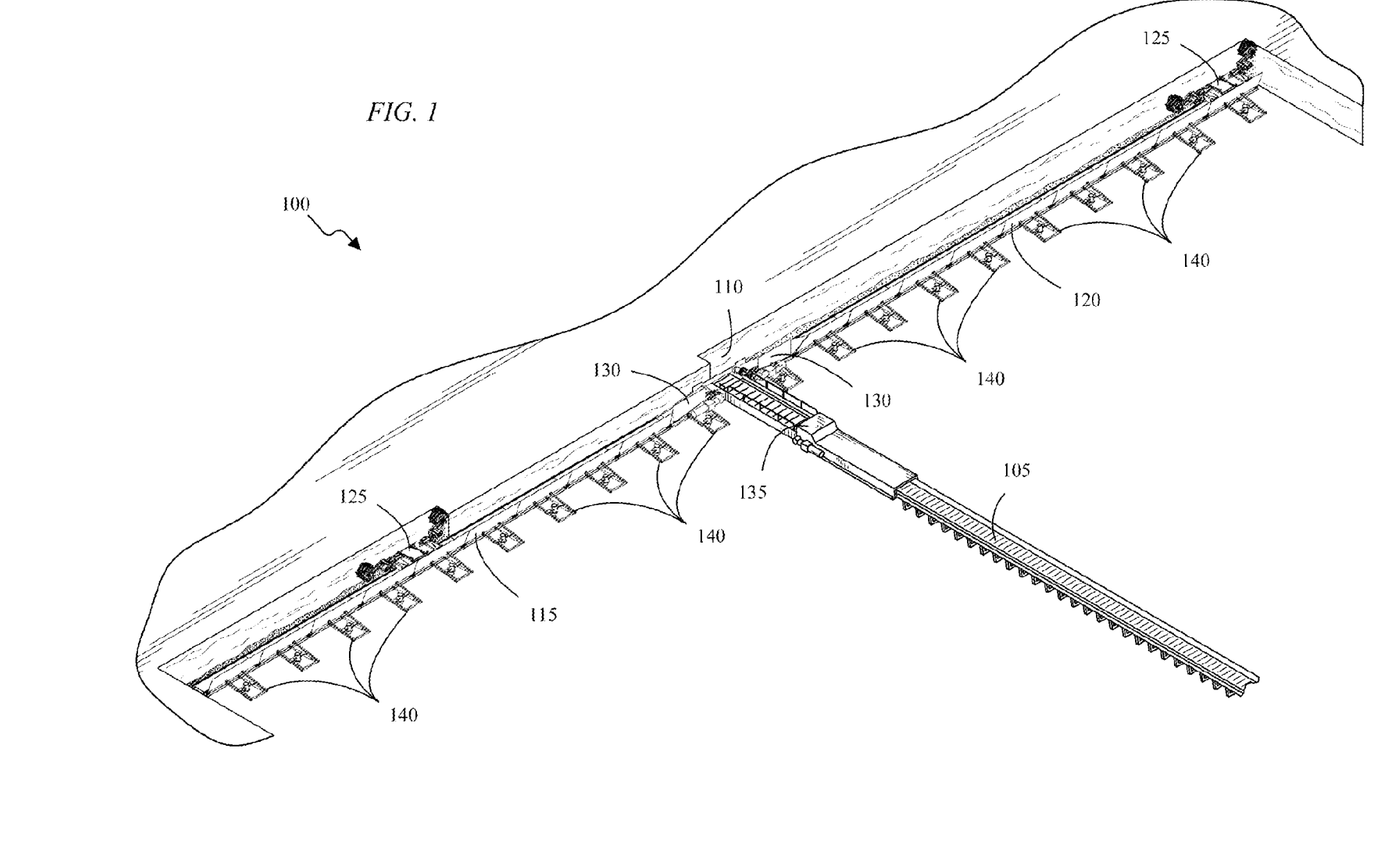
FIG. 1 is a perspective view of a longwall mining system.

FIG. 1 illustrates a longwall mining system 100. The mining system 100 includes a discharge conveyor 105 extending away from a mining face 110. Two conveyors 115 and 120 extend along the mining face 110. Longwall shearers 125 are mounted on the conveyors 115 and 120 for movement in a lateral direction substantially parallel to the mining face 110. The conveyors 115 and 120 include a drive end defining a discharge portion 130 positioned adjacent the discharge conveyor 105. The discharge conveyor 105 includes a crusher 135 for reducing the size of the mined material for further processing and storage. Conveyor translation devices 140 are operable to move the conveyors 115 and 120 toward the mining face 110. In some embodiments, the longwall mining system 100 is used in an underground mining operation and further includes a plurality of powered roof supports (not shown).

Figure 2:
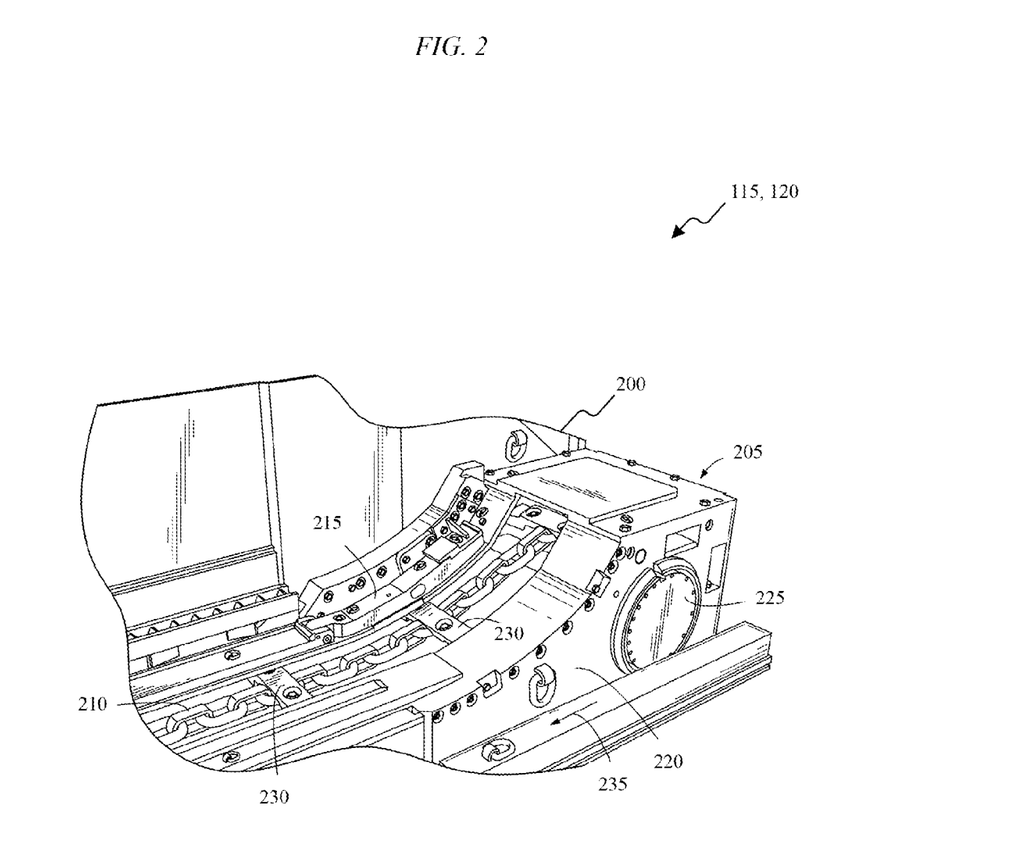
FIG. 2 illustrates a portion of a chain conveyor including an end frame.

FIG. 2 illustrates a portion of a longwall conveyor 200 similar to the conveyors 115, 120 of FIG. 1. The conveyor 200 includes a return end 205, a conveying element or chain 210 that travels between the return end 205 and the discharge portion 130 (see FIG. 1), and a sensor assembly 215 proximate to the return end 205. The chain 210 is driven by a drive mechanism, such as a variable speed motor, associated with the discharge portion 130. The return end 205 includes a frame 220, a sprocket or take-up shaft 225 mounted on the frame 220, and at least one hydraulic cylinder (not shown). The frame 220 moves with respect to the discharge portion 130 based on the extension and retraction of the hydraulic cylinder. The chain 210 passes around the take-up shaft 225 to travel in a continuous loop between the discharge portion 130 and the return end 205. The chain 210 includes a plurality of flight members or bars 230 mounted on the chain 210 and spaced apart by a first distance in a direction of travel 235 of the chain 210.

Figure 3:
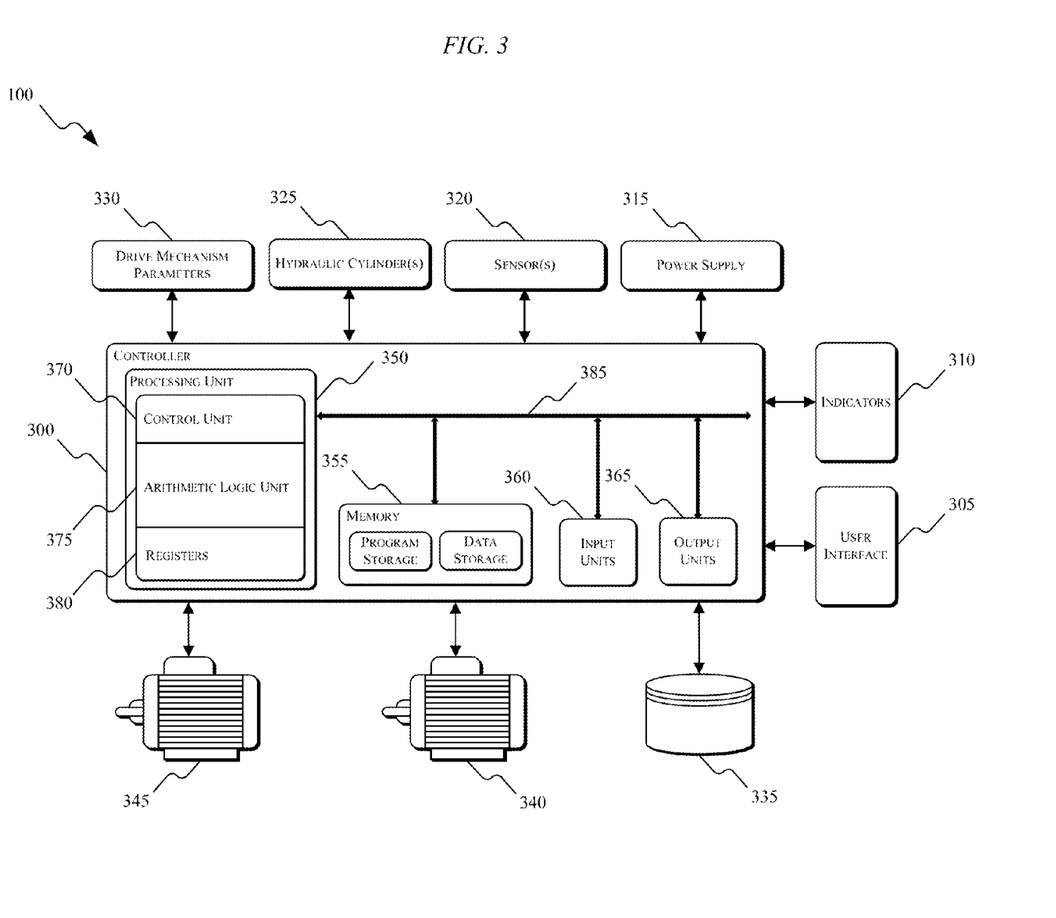
FIG. 3 illustrates a controller for a chain conveyor according to an embodiment of the invention.

FIG. 3 illustrates a controller 300 associated with the conveyor 115, 120, 200, and/or the mining system 100. The controller 300 is connected or coupled to a variety of additional modules or components, such as a user interface module 305, one or more indicators 310, a power supply module 315, one or more sensors 320, one or more hydraulic cylinders 325, a drive mechanism or motor parameters module 330, a data store or database 335, a first drive mechanism and drive 340 (e.g., associated with the main-gate), and a second drive mechanism and drive 345 (e.g., associated with the tailgate). In some embodiments, the first drive mechanism and drive 340 includes a first motor and a first motor drive, and the second drive mechanism and drive 345 includes a second motor and second motor drive. In some embodiments, a first motor and first motor drive 340 and the second motor and second motor drive 345 each include switchgear assemblies. The motors are, for example, variable speed motors and the motor drivers are, for example, variable speed motor drives. Embodiments of the invention described herein are described with respect to the drive mechanisms and drives being motors and motor drives. The one or more sensors 320 are, for example, tachometers configured to measure or sense a characteristic of the first motor, the second motor, the first sprocket, or the second sprocket (e.g., a rotational position, a rotational speed, a rotational acceleration, an angular displacement, etc.), proximity sensors configured to measure or sense a characteristic of the chain (e.g., a chain position, a chain speed, a chain acceleration, etc.), power transducers within the conveyor 115, 120, 200 configured to measure or sense an electrical characteristic (e.g., current, voltage, power factor, torque, speed, input power, output power, etc.), load cells, etc. The controller 300 includes combinations of hardware and software that are operable to, among other things, control the operation of the conveyor 115, 120, 200 control the position of the one or more hydraulic cylinders 325, activate the one or more indicators 310 (e.g., a liquid crystal display ["LCD"]), monitor the operation of the conveyor 115, 120, 200 and/or the mining system 100, etc.

In some embodiments, the controller 300 includes a plurality of electrical and electronic components that provide power, operational control, and protection to the components and modules within the controller 300, the conveyor 115, 120, 200, and/or the mining system 100. For example, the controller 300 includes, among other things, a processing unit 350 (e.g., a microprocessor, a microcontroller, or another suitable programmable device), a memory 355, input units 360, and output units 365. The processing unit 350 includes, among other things, a control unit 370, an arithmetic logic unit ("ALU") 375, and a plurality of registers 380 (shown as a group of registers in FIG. 3), and is implemented using a known computer architecture, such as a modified Harvard architecture, a von Neumann architecture, etc. The processing unit 350, the memory 355, the input units 360, and the output units 365, as well as the various modules connected to the controller 300 are connected by one or more control and/or data buses (e.g., common bus 385). The control and/or data buses are shown generally in FIG. 3 for illustrative purposes. The use of one or more control and/or data buses for the interconnection between and communication among the various modules and components would be known to a person skilled in the art in view of the invention described herein. In some embodiments, the controller 300 is implemented partially or entirely on a semiconductor chip, is a field-programmable gate array ("FPGA"), is an application specific integrated circuit ("ASIC"), etc.

The memory 355 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices or data structures. The processing unit 350 is connected to the memory 355 and executes software instructions that are capable of being stored in a RAM of the memory 355 (e.g., during execution), a ROM of the memory 355 (e.g., on a generally permanent basis), or another non-transitory computer readable medium such as another memory or a disc. Software included in the implementation of the conveyor 115, 120, 200 and/or the mining system 100 can be stored in the memory 355 of the controller 300. The software includes, for example, firmware, one or more applications, program data, filters, rules, one or more program modules, and other executable instructions. The controller 300 is configured to retrieve from memory and execute, among other things, instructions related to the control processes and methods described herein. In other constructions, the controller 300 includes additional, fewer, or different components.

The drive mechanism or motor parameters module 330 is connected to or associated with the motors and drives 340, 345 that are coupled to the first sprocket and/or the second sprocket. The parameters module 330 is configured to receive signals associated with one or more parameters (e.g., current, voltage, power factor, torque, speed, input power, output power, etc.) of the motors 340, 345. In some embodiments, the parameters module 330 receives signals related to the motor parameters. In other embodiments, the parameters module 330 includes or is connected to the one or more sensors 320 for sensing the motor parameters.

The motors 340, 345 are controlled by control signals received from the controller 300 or another associated controller. The motors 340, 345 are also coupled to gear reduction boxes to reduce the rotational speed of the motors to a rotational speed appropriate for the sprockets and conveyor. In some embodiments, the controller 300 is configured to control the motors 340, 345 and the conveyors 115, 120 and/or mining system 100 autonomously using the sensors 320 and one or more stored programs or modules. In other embodiments, the controller 300 is configured to control the motors and the conveyors 115, 120 and/or the mining system 100 based on a combination of manual inputs and automatic controls. The one or more hydraulic cylinders 325 also receive control signals from the controller 300, and selectively extend or retract the return end frame (e.g., change the position of the first sprocket, the second sprocket, etc.) based on the control signals from the controller 300. The controller 300 also monitors the motors and the one or more hydraulic cylinders 325 to determine related characteristics. For example, the controller 300 can monitor or sense electrical characteristics of the motors 340, 345, the position of the one or more hydraulic cylinders 325 (e.g., an extension of the one or more hydraulic cylinders), etc. Although a single controller is illustrated, in other constructions, the controller 300 may be separated into a plurality of controllers. For example, the controller 300 may be separated into a consolidated control unit ("CCU"), a programmable control unit ("PCU"), etc. The CCU can be housed in an explosion-proof enclosure and provides control over the conveyor system. The PCU is an intrinsically safe system that can be interfaced with the CCU for, among other things, stopping, inhibiting, tripping, etc., the operation of the conveyor.

The user interface module 305 is used to control or monitor the AFC or the mining system. For example, the user interface module 305 is operably coupled to the controller 300 to control the speed of the conveyor, the speed of the one or more motors, etc. The user interface module 305 can include a combination of digital and analog input or output devices required to achieve a desired level of control and monitoring for the AFC. For example, the user interface module 305 can include a display and input devices such as a touch-screen display, one or more knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In other constructions, the display is a Super active-matrix OLED ("AMOLED") display. The user interface module 305 can also be configured to display conditions or data associated with the AFC in real-time or substantially real-time. For example, the user interface module 305 is configured to display measured electrical characteristics of the AFC, the status of the AFC, chain tensions, fault conditions (e.g., slack chain, zero tension chain, etc.), an amount of mined material on the conveyor, the position of the chain or components of the chain, etc. In some embodiments, the user interface module 305 is controlled in conjunction with the one or more indicators 310 (e.g., LEDs) to provide visual indications of the status or conditions of the conveyor 115, 120, 200, and/or the mining system 100, the position of a chain or components of the chain, etc.

Figure 4:
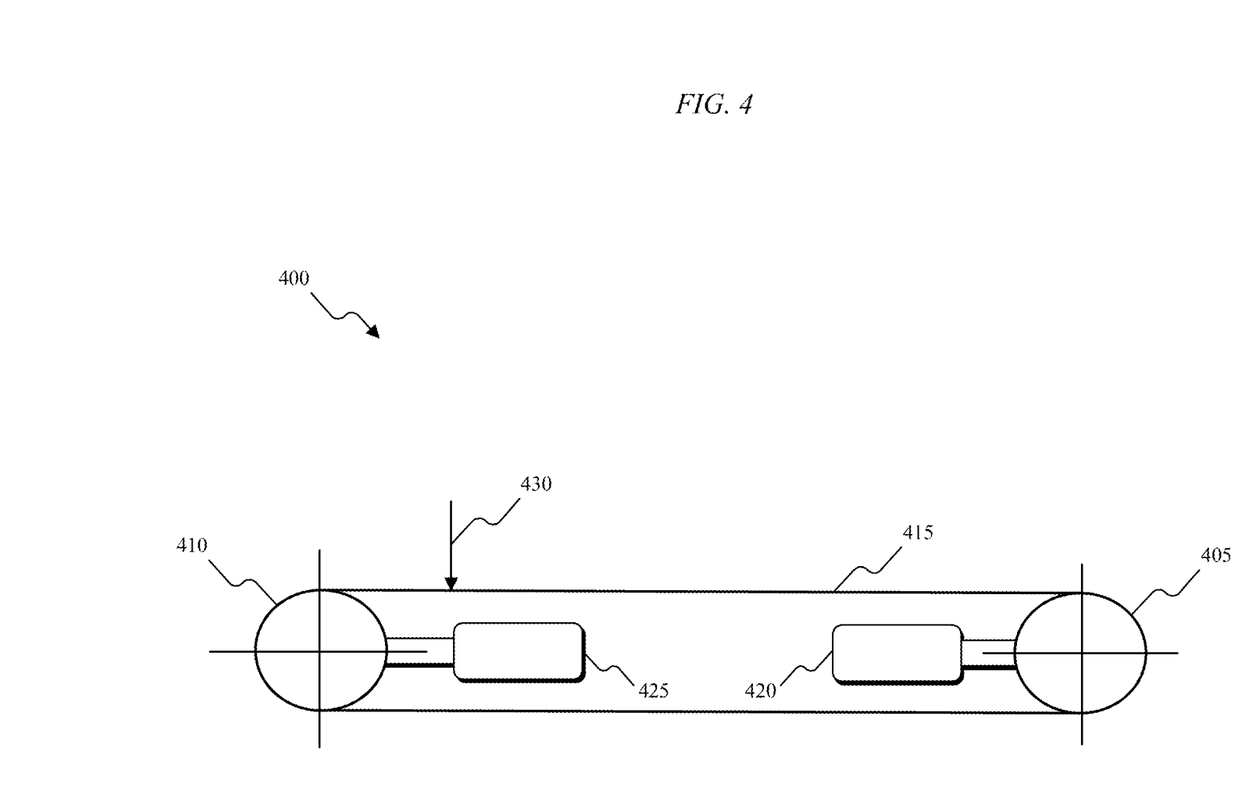
FIG. 4 is a diagram illustrating a generalized conveyor and a datum point of the conveyor.

A generalized illustration of a conveyor 400 for the mining system 100 is illustrated in FIG. 4. The conveyor 400 is similar to the conveyors 115, 120, and 200 described above. The conveyor 400 includes a first sprocket or maingate sprocket 405, a second sprocket or tailgate sprocket 410, one or more chains 415 (e.g., two chains), a first hydraulic cylinder 420, a second hydraulic cylinder 425, and a datum point 430. The datum point 430 corresponds to, for example, a point on the conveyor 400 where the mapping of the chains 415 is initiated and/or a point on the conveyor 400 where maintenance is most easily performed. The datum point 430 can be selected to be any point on the conveyor 400. In some embodiments, the datum point 430 can be recalibrated. For example, although there is a positive, fixed relationship between the chains 415 and the sprockets 405, 410, a torque limiting device associated with a drive mechanism for a sprocket can be activated to prevent excessive torque. When the torque limiting device is activated, the movement of the chain does not correspond to the movement of the motor and the angular displacement sensed by a motor shaft tachometer. As a result, the datum point 430 would be recalibrated to the new angular position of the motor after the torque limiting device has been deactivated. The recalibration of the datum point 430 can be performed manually or automatically (e.g., using the controller 300).

A chain map for the chains 415 of the conveyor 400 can be established based on the selected datum point as well as additional properties of the conveyor 400. A process 500 for establishing a chain map for the chains 415 is provided in FIG. 5. The process 500 is associated with and described herein with respect to establishing a chain map for a conveyor. Various steps described herein with respect to the process 500 are capable of being executed simultaneously, in parallel, or in an order that differs from the illustrated serial manner of execution. The process 500 may also be capable of being executed using fewer steps than are shown in the illustrated embodiment.

Figure 5:
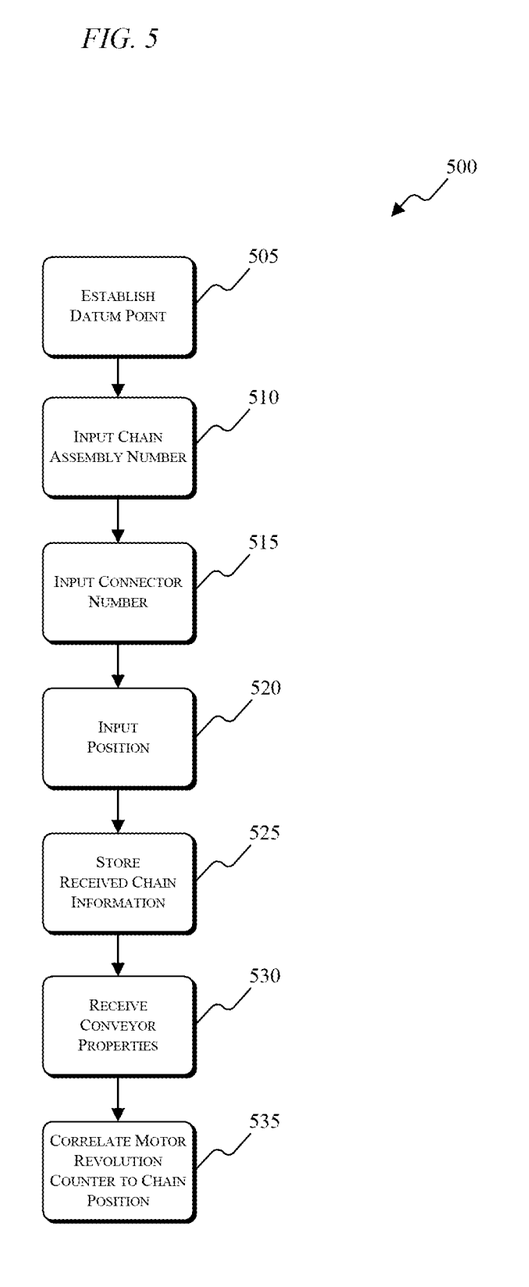
FIG. 5 is a process for creating a conveyor chain map according to an embodiment of the invention.

The process 500 begins with the establishment of a datum point 430 as described above with respect to FIG. 4 (step 505). The datum point 430 corresponds, for example, to a point on the conveyor 400 where the mapping of the chain is initiated and/or a point on the conveyor 400 where maintenance is to be performed. The datum point 430 is a reference point for subsequent chain data entry and determinations based on the position of the chain. After the datum point 430 has been established, a chain assembly number can be entered to identify the particular chain assembly that is being mapped (step 510). For example, a mining system may include a plurality of chain assemblies that are used with AFCs, BSLs, etc. Identifying the chain assembly number allows one chain assembly to be distinguished from another within the mining system for the purpose of updating a chain map, performing maintenance, etc. After inputting a chain assembly number, the chain component or connector numbers are inputted (step 515). The chain connectors can be individual chain links, flight bars, chain links and flight bars, etc. In some embodiments, each chain assembly includes two chains 415. With respect to an AFC, one chain can be positioned on the mining face side of the conveyor and the other chain is positioned away from the mining face side of the conveyor. The chains 415 are incrementally rotated around the length of the conveyor 400. The conveyor is stopped for each chain connector that is to be mapped, and its corresponding data (e.g., connector number) is inputted to the chain map. After inputting a connector number, a position of the chain connector is inputted to the map (step 520). The position of the chain connector can be manually input by a user or automatically determined and associated with the chain connector. The correlation of a chain connector position and a specific chain connector can be performed when each chain connector is individually mapped, or the position of the chain connector can be later correlated to a specific chain connector. For example, a resolver or tachometer value can be used to associate a position of a chain connector to a rotational position of an actuator (e.g., motor). The motor shaft tachometer value can then later be used to formally correlate the position of each chain connector to an absolute position on the conveyor (e.g., with respect to the datum point 430). When the information associated with the last chain connector in a chain has been inputted, the total length of the chains 415 are known and/or can be calculated based on the number of chain connectors. The final chain connector to have information can be annotated or set to indicate an end of a cycle (e.g., one revolution around the conveyor 400).

After chain information for each chain connector and chain assembly has been entered at steps 505-520, the inputted information is stored in a memory associated with the conveyor 400 or mining system 100 (e.g., memory 355).

At step 530, one or more conveyor properties are received and/or retrieved from a memory (e.g., memory 355). The conveyor properties include information related to the motor shaft tachometer, a transmission gear box ratio, chain pitch/angle measurements (e.g., angle of chain coming off return end frame, etc.), the number of teeth on each sprocket, etc. These conveyor properties can be used to correlate a motor shaft tachometer position to a distance of movement of the chains 415 along the conveyor (e.g., one full rotation of the motor corresponds to a known number of chain connectors passing the datum point 430). As such, these conveyor properties are used to correlate the relative position of each chain connector (e.g., with respect to the datum point 430) with an actual translational position of the chains 415 about the conveyor (i.e., an absolute position and speed of a chain connector can be determined or known based on the fixed datum point 430 and the driven rotation of a sprocket by a motor). In some embodiments, a chain link counter is incremented based on an output signal from the tachometer to count a number of chain links that have passed the datum point. In such embodiments, the chain link counter can be reset with any portion of the chains 415 corresponding to the datum point 430. When the position of each chain connector is correlated with the rotation of the motor, the chain map can be used to monitor the rotation of the chains 415 around the conveyor 400 in substantially real-time and update or calculate the absolute position of one or more chain connectors (e.g., each of chain connectors).

FIGS. 6-9 illustrate an interface 600 for displaying a chain map, updating the chain map, performing maintenance on a conveyor, and/or monitoring the operation of the conveyor. The interface 600 includes a first screen 605. The first screen 605 includes a graphical display window 610 and a component or connector display window 615. The graphical display window 610 provides a graphical representation of the mining system 100 including the AFCs 115 and 120, as well as the BSL 105 (see FIG. 1). A user can select the BSL 105, AFC 115, or AFC 120 to edit the corresponding chain map for each chain assembly, to perform maintenance on a specific one of the chain assemblies, or monitor the operation of a specific one of the chain assemblies, as described in more detail below. In some embodiments, the AFC 115, 120 and the BSL 105 are controlled through separate interfaces, or each conveyor is password protected to restrict access to the chain map for the individual conveyors.

Figure 6:
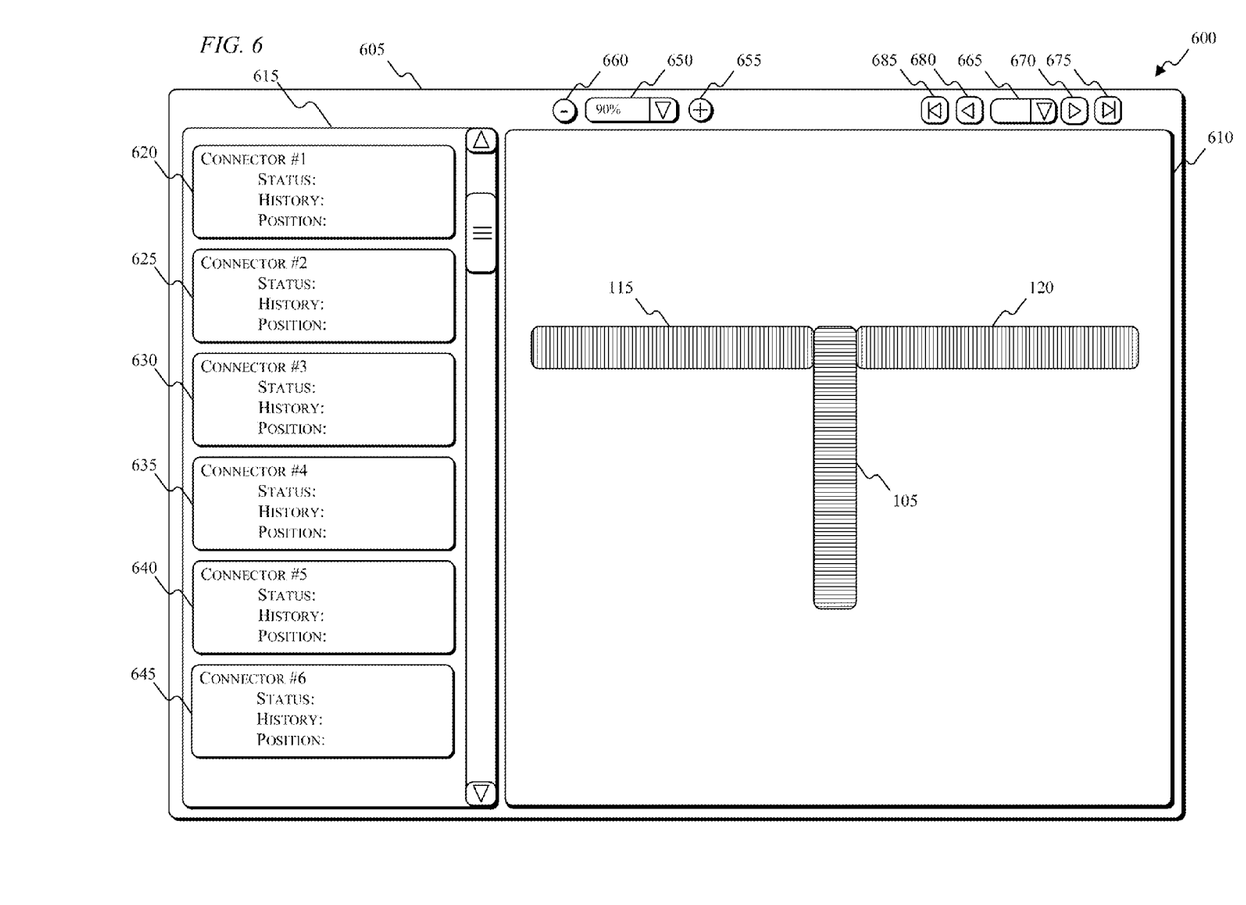
FIGS. 6, 7, 8, and 9 illustrate user interfaces for monitoring and/or updating a conveyor chain map according to embodiments of the invention.

An operator is able to accomplish the functions of the interface 600 by selecting or populating portions of the interface 600 with information (e.g., text, selections, etc.). In some embodiments, the user populates input portions of the interface 600 (e.g., text boxes, check boxes, etc.) by entering text via a mechanical or virtual keyboard, and using a pointing or selection device such as a mouse to control a curser on a display in the user interface 305. Input signals from the keyboard and the mouse are received and processed by the controller 300 and translated into a visual result or action in the interface 600. For example, if the user enters text using a keyboard, the activated keys cause the controller 300 to produce signals which are represented as type-written text in the interface 600. Similarly, a mouse click which corresponds to a location of the cursor on the screen results in selecting/deselecting a check box, highlighting text, etc. Similar inputs can be provided through the use of a touch-screen display. Other input devices for selecting or populating portions of the interface 600 include knobs, dials, switches, buttons, etc.

Figure 7:
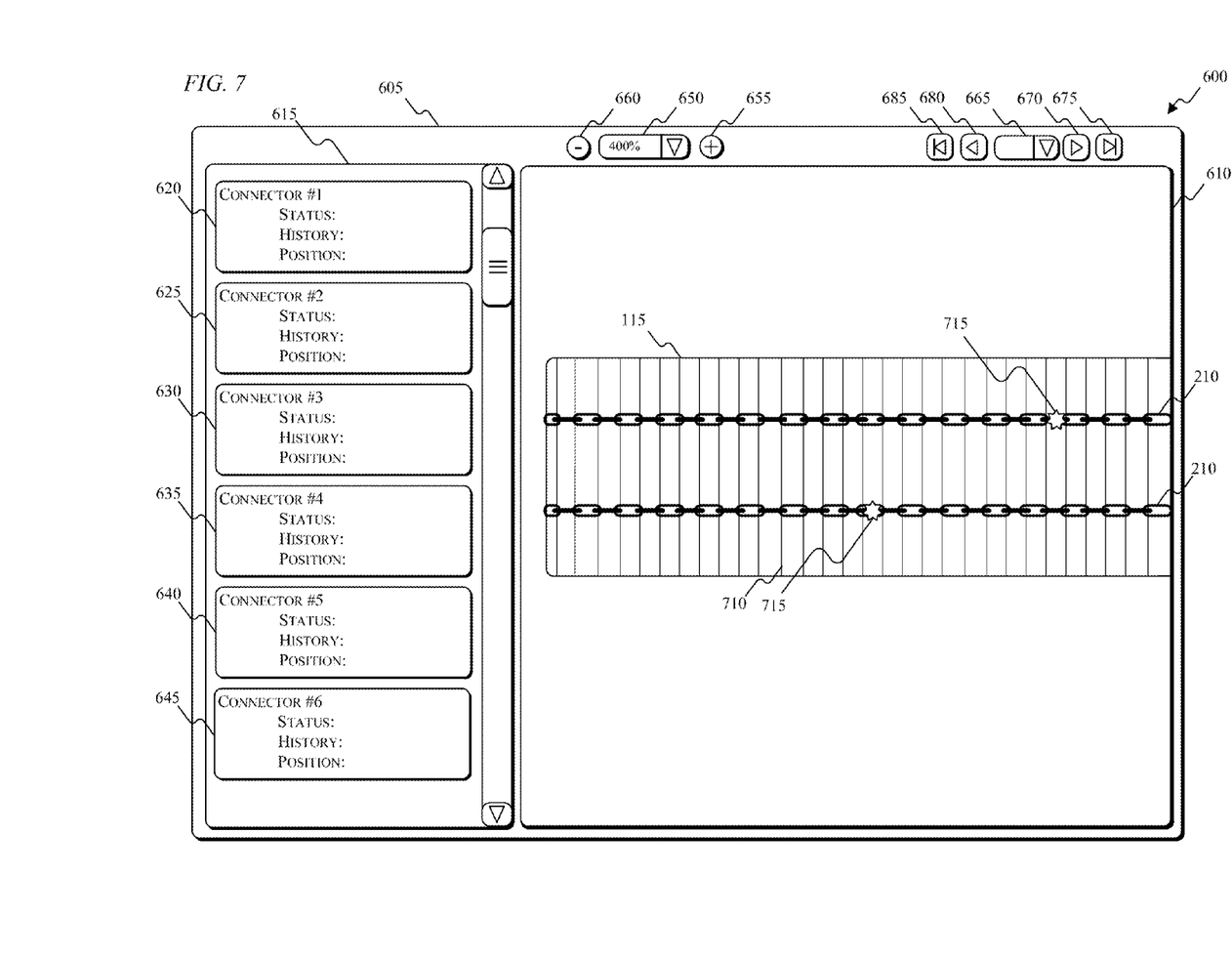
Figure 8:
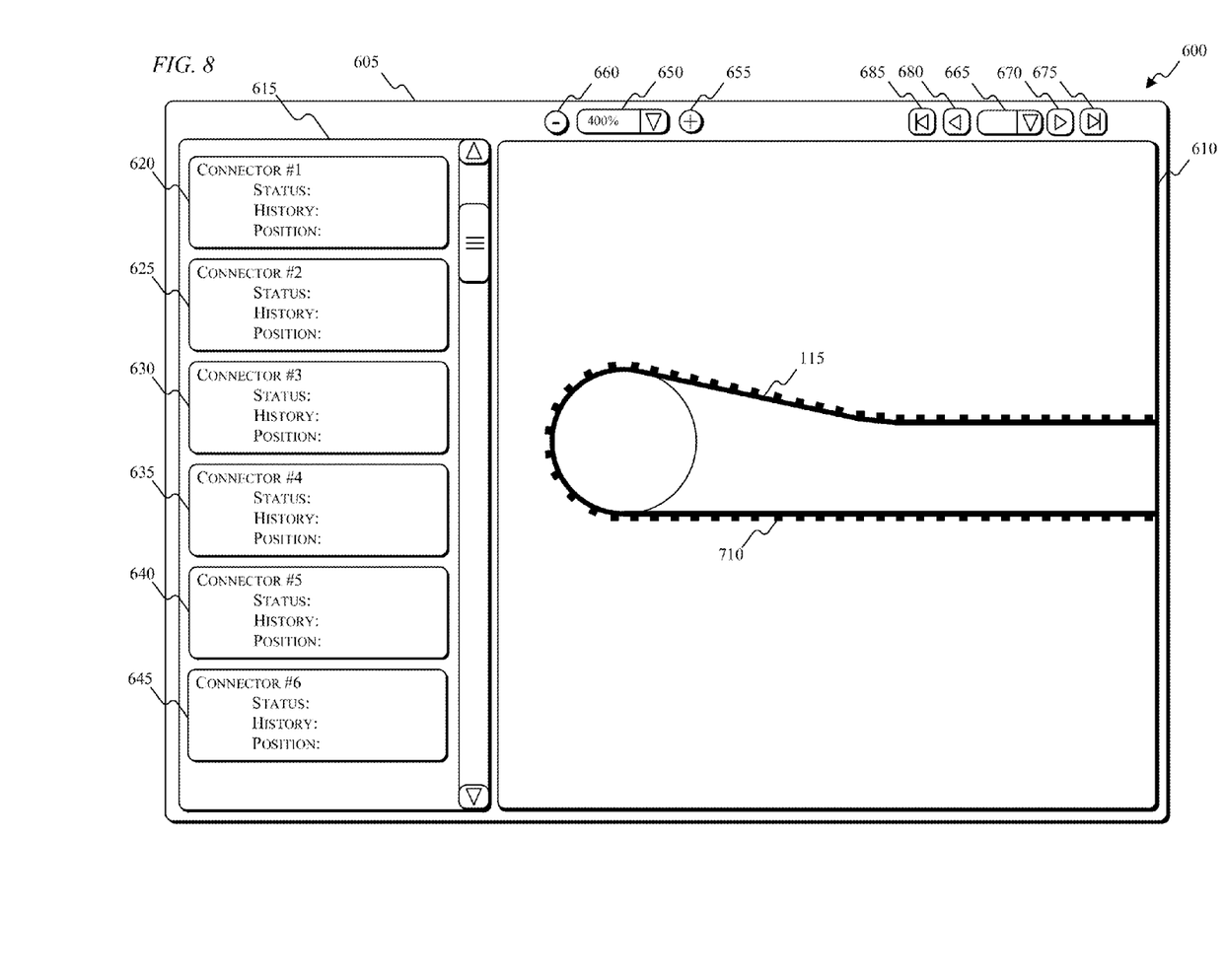

The graphical display window 610 can be controlled using a zoom input device 650, an increase zoom input device 655, and a decrease zoom input device 660. The input devices 650-660 can be used to zoom in on a particular chain assembly or chain connector, as also described below. FIG. 7 illustrates the graphical display window 610 zooming in on AFC 115. Individual chain connectors of the AFC 115 are illustrated graphically. An operator is able to select a specific one of the plurality of chain connectors 710 illustrated in the graphical display window 610 to view status information, history information, position information, etc. The graphical display window 610 can also illustrate chain connectors 715 that, for example, require maintenance. In some embodiments, a chain connector number is also displayed in the graphical display window 610 for each chain connector 710. Additionally or alternatively from the top view of the mining system 100 and AFC illustrated in FIGS. 6 and 7, respectively, a particular chain assembly can be viewed in profile, as illustrated in FIG. 8. Similar to FIGS. 6 and 7, with respect to FIG. 8, an operator is able to select a specific one of the plurality of chain connectors 710 illustrated in the graphical display window 610 to view status information, history information, position information, etc.

Figure 9:
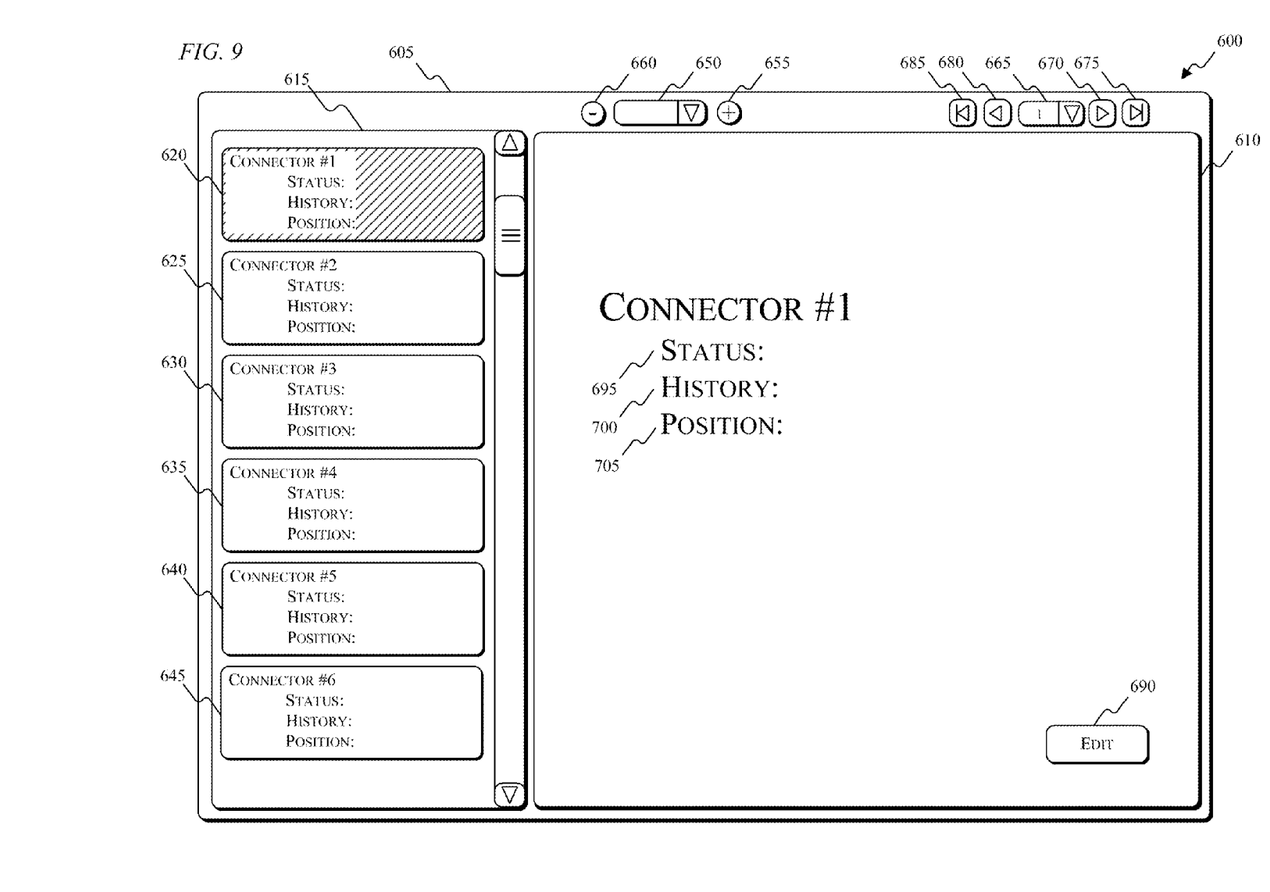

The connector display window 615 also provides information related to each of the chain connectors in each of the chain assemblies. The connector display window enables a user to select a specific connector and/or a specific chain assembly. For example, selecting connector #1 in the connector display window 615 causes the connector's status information, history information, position information, etc., to be displayed in the graphical display window 610, as illustrated in FIG. 9. An edit input device (e.g., button) can be selected to change or update information related to a specific connector. For example, the information associated with a specific connector can be updated after maintenance is performed, can be marked as damaged (e.g., when maintenance may be required), etc. In some embodiments, the position of each connector can be automatically updated in substantially real time. In other embodiments, the position of a connector is updated when the connector is selected in the interface 600. Additional information, such as the position of the chain and the position on the chain where a sudden and severe overload condition occurred, maintenance station positions, elongation measurements, and chain remaining life can be manually or automatically included in the chain map. Chain remaining life can be determined by the controller 300 based on the chain's elastic modulus. A chain's elastic modulus changes as it goes through its life cycle. A chain's average elastic modulus can be calculated based on sprocket phase and an applied torque. The elastic modulus of a chain can be logged in the chain map and, when a particular value for elastic modulus has been reached, an indication can be provided to an operator that the chain is nearing the end of its life. In some embodiments, chain elongation or an amount of chain stretch in the chain 415 at a given time is determined in a manner similar to that disclosed in U.S. patent application Ser. No. 13/553,215, entitled "SYSTEMS AND METHODS FOR CONTROLLING A CONVEYOR IN A MINING SYSTEM," filed Jul. 19, 2012, the entire content of which is hereby incorporated by reference.

The interface 600 also includes input control devices to navigate among the chain assemblies and chain components within the chain assemblies. For example, input device 665 is a drop-down menu that allows an operator to select a specific chain assembly or a specific chain connector within a chain assembly. A forward input device 670 and a forward-end input device 675 can also be used for navigation. The forward input device 670 increments a chain assembly or a chain connector displayed in the graphical display window 610 to the next chain assembly or chain connector. The forward-end input device 675 advances the graphical display window 610 to the last chain assembly or the last chain connector in a chain assembly. A backward input device 680 and a backward-end input device 685 can also be used for navigation. The backward input device 680 decrements a chain assembly or a chain connector displayed in the graphical display window 610 to the previous chain assembly or chain connector. The backward-end input device 685 retreats the graphical display window 610 to the first chain assembly or the first chain connector in a chain assembly.

The controller 300 is operable or configured to calculate or determine a position of any of the chain connectors (e.g., chain links, flight bars, etc.) in the chain 415 to provide substantially real-time positional information to the operator through the interface 600. For example, the controller 300 receives a signal related to the number of chain links that have passed the datum point 430 from a first sensor (e.g., a motor tachometer). In some embodiments, the controller 300 calculates or determines the number of chain links that have passed the datum point 430 by, for example, using a motor tachometer position, a transmission gearbox ration, chain pitch measurements, and the number of teeth on a sprocket to determine or calculate the number of chain links that have passed the datum point 430, as described above. Based on the noted factors, the controller 300 knows or determines a number of chain links that correspond to one revolution of a sprocket (or a partial revolution of the sprocket) according to the sensed angular displacement from the tachometer. Once the controller 300 knows the number of chain links or connectors that would have been rotated around the sprocket, the same number of chains links or connectors would have passed the datum point (i.e., due to the fixed, positive relationship between the chain and the sprocket). With the datum point 430 as a reference, the controller 300 then calculates or determines the current location of each chain connector or link in the conveyor.

Figure 10:
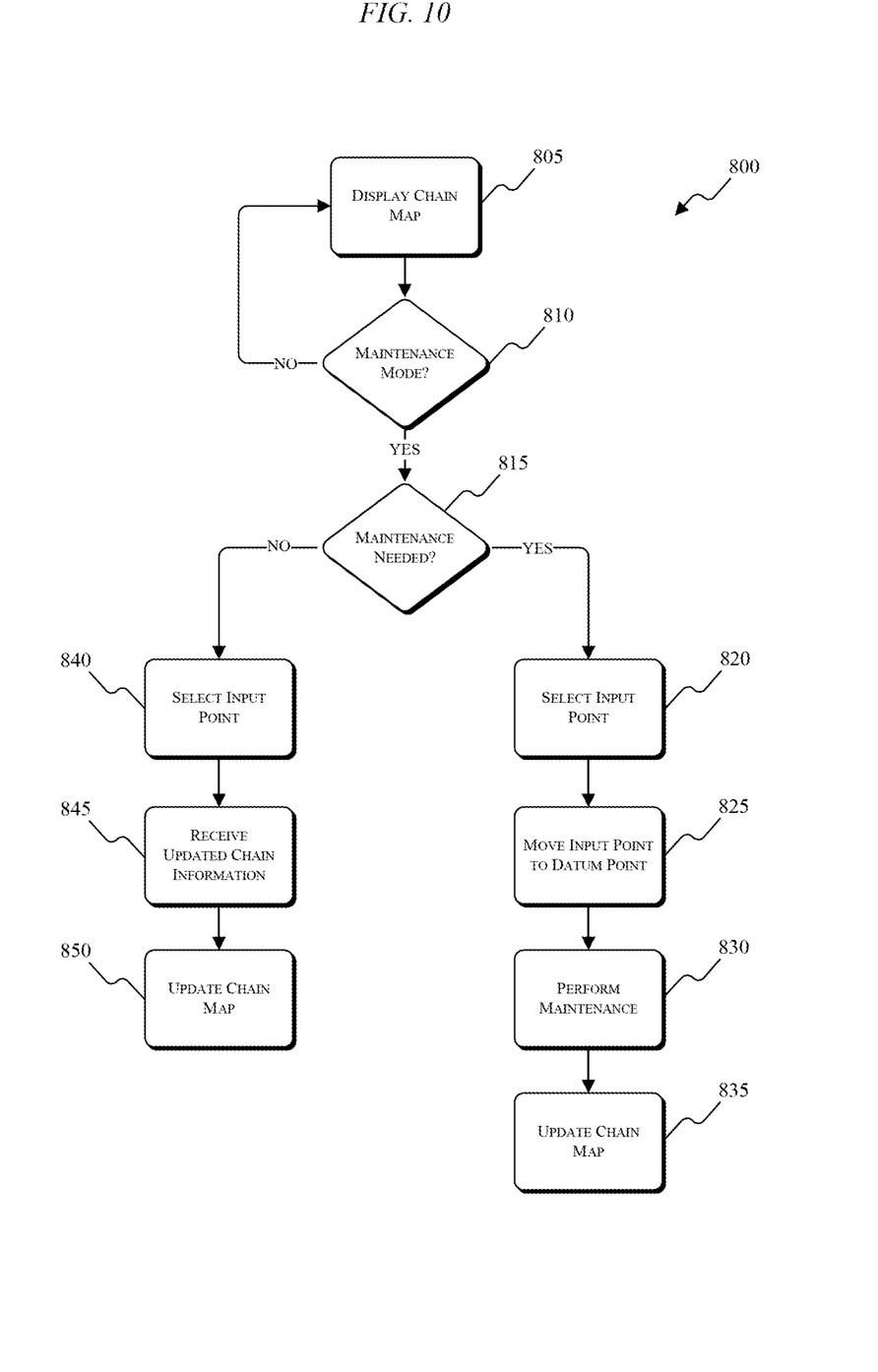
FIG. 10 is a process for updating a chain map according to an embodiment of the invention.

With up-to-date and substantially real-time positional information, a chain assembly and its chain connectors can be monitored, have their status and history information updated, and have maintenance performed in an efficient manner. FIG. 10 illustrates a process 800 that is associated with and described herein with respect to updating a chain map and performing maintenance on a chain. Various steps described herein with respect to the process 800 are capable of being executed simultaneously, in parallel, or in an order that differs from the illustrated serial manner of execution. The process 800 may also be capable of being executed using fewer steps than are shown in the illustrated embodiment. The process 800 begins with displaying the chain map as described above with respect to FIGS. 6-9 (step 805). At step 810, the controller 300 determines whether the conveyor has entered a maintenance mode. A maintenance mode is, for example, a mode in which one or more chain connectors or other components of the conveyor need to be repaired or replaced, one or more chain connectors have new information to be entered into the map, etc. If, at step 810, the conveyor has not entered a maintenance mode (e.g., is operating normally), the process 800 returns to step 805. If, at step 810, the conveyor has entered the maintenance mode, a determination is made about whether the maintenance mode required immediate maintenance or if the conveyor can continue to be operated without immediate maintenance (step 815). If immediate maintenance is required, the process 800 proceeds to step 820 where an input point if a chain assembly is selected. The input point corresponds to, for example, a point in the chain assembly that requires maintenance and/or a point on the conveyor where maintenance is to be performed. The input point is moved to, for example, the predetermined datum point 430 (e.g., when the datum point corresponds to a preferred maintenance point) (step 825). After the input point has been moved to the position where maintenance will be performed, the maintenance is performed (step 830). The maintenance can include the replacement of a flight bar, replacement of a chain link, replacement of connector number, addition of connector, performing a recalibration, etc. Following the maintenance, the chain map is updated to reflect the repairs/replacements that were performed (step 835). In some embodiments, each time an operator modifies the chain map (e.g., adds information, deletes information, updates information, etc.), the modification can be time stamped with the date, time, and operator identity to allow modifications to the chain map to be tracked.

If, at step 815, immediate maintenance is not required, the process 800 proceeds to step 840 where an input point of a chain assembly is selected. The input point corresponds to, for example, a point in the chain assembly that is to be updated in the chain map (i.e., when immediate maintenance is not required) or that is to be monitored using the chain map. At step 845, an operator provides updated information associated with the chain assembly (e.g., a chain connector), and the chain map is updated to reflect the new information received from the operator. In some embodiments, information that is entered into the chain map that applies to multiple chain connectors or is separate from a specific connector and its history is illustrated in a different color in the chain map.

Thus, the invention may generally provide, among other things, systems, methods, devices, interfaces, and computer readable media for establishing a chain map for a conveyor, updating the chain map, and performing maintenance on a chain.

What is claimed is:

1. A mining system comprising:
   a conveyor including
      a first sprocket and a second sprocket,
      a chain associated with the first sprocket and the second sprocket, the chain including a plurality of chain components,
      a drive mechanism coupled to the first sprocket or the second sprocket, the drive mechanism operable to drive the first sprocket or the second sprocket, and
      a sensor operable to generate a signal related to a characteristic of the conveyor; and
   a controller operable to
      receive the signal from the sensor,
      determine a number of chain components that have passed a datum point based on the signal,
      determine the location of at least one of the plurality of chain components based on the number of chain components that have passed the datum point, and
      update a map of the chain based on the location of the at least one of the plurality of chain components.

2. The mining system of claim 1, wherein the characteristic of the conveyor is a position associated with the drive mechanism.

3. The mining system of claim 2, wherein the sensor is a tachometer.

4. The mining system of claim 1, further comprising a display device.

5. The mining system of claim 4, the controller further operable to generate one or more signals to produce a graphical representation of the chain based on the map of the chain, the graphical representation of the chain being displayed on the display device.

6. The mining system of claim 5, wherein the graphical representation of the chain includes a graphical representation of the location of the at least one of the plurality of chain components.

7. The mining system of claim 6, wherein the controller is further configured to position the at least one of the chain components at the datum point based on a selection made on the graphical representation of the chain.

8. A method of determining a location of a chain component of a chain in a conveyor of a mining system, the method comprising:
   receiving, at a processor, a signal from a sensor related to a characteristic of the conveyor;
   determining, using the processor, a number of chain components that have passed a datum point based on the signal;
   determining, using the processor, the location of the chain component based on the number of chain components that have passed the datum point; and
   updating, using the processor, a map of a chain based on the location of the chain component.

9. The method of claim 8, wherein the characteristic of the conveyor is a position associated with a drive mechanism.

10. The method of claim 9, wherein the sensor is a tachometer associated with the drive mechanism.

11. The method of claim 8, further comprising generating one or more signals to produce a graphical representation of the chain based on the map of the chain, and displaying the graphical representation of the chain on a display device.

12. The method of claim 11, wherein the graphical representation of the chain includes a graphical representation of the location of the chain component.

13. The method of claim 12, further comprising receiving an input signal associated with the graphical representation of the chain, and positioning the chain component at the datum point based on the input signal.

14. The method of claim 13, further comprising performing maintenance on the chain at the datum point, and updating the map of the chain based on the performed maintenance.

15. A controller including a processor and a memory, the controller comprising executable instructions stored in the memory to:
   receive, at the processor, a signal from a sensor related to a characteristic of a conveyor;
   determine, using the processor, a number of chain components that have passed a datum point of the conveyor based on the signal;
   determine, using the processor, a location of a chain component based on the number of chain components that have passed the datum point of the conveyor; and
   update, using the processor, a map of a chain stored in the memory based on the location of the chain component.

16. The controller of claim 15, wherein the characteristic of the conveyor is a position associated with a drive mechanism.

17. The controller of claim 16, wherein the sensor is a tachometer associated with the drive mechanism.

18. The controller of claim 15, further comprising executable instructions stored in the memory to:

generate one or more signals to produce a graphical representation of the chain based on the map of the chain; and display the graphical representation of the chain on a display device.

19. The controller of claim 18, wherein the graphical representation of the chain includes a graphical representation of the location of the chain component.

20. The controller of claim 19, further comprising executable instructions stored in the memory to:

receive an input signal associated with the graphical representation of the chain; and position the chain component at the datum point based on the input signal.

* * * * *